US010982787B2

(12) United States Patent
Glime, III et al.

(10) Patent No.: US 10,982,787 B2
(45) Date of Patent: Apr. 20, 2021

(54) FLOW CONTROL DEVICE WITH FLOW ADJUSTMENT MECHANISM

(71) Applicant: Swagelok Company, Solon, OH (US)

(72) Inventors: William H. Glime, III, Chagrin Falls, OH (US); Branden W. Keeper, Mentor, OH (US)

(73) Assignee: SWAGELOK COMPANY, Solon, OH (US)

( * ) Notice: Subject to any disclaimer, the term of this patent is extended or adjusted under 35 U.S.C. 154(b) by 39 days.

(21) Appl. No.: 16/280,132

(22) Filed: Feb. 20, 2019

(65) Prior Publication Data

US 2019/0257440 A1 Aug. 22, 2019

Related U.S. Application Data

(60) Provisional application No. 62/633,705, filed on Feb. 22, 2018.

(51) Int. Cl.
*F16K 31/122* (2006.01)
*F16K 7/14* (2006.01)
(Continued)

(52) U.S. Cl.
CPC .............. *F16K 31/122* (2013.01); *F16K 7/14* (2013.01); *F16K 27/0236* (2013.01);
(Continued)

(58) Field of Classification Search
CPC .......... F16B 39/24; F16K 7/14; F16K 31/126; B05C 5/0237
See application file for complete search history.

(56) References Cited

U.S. PATENT DOCUMENTS

| 135,809 A | * | 2/1873 | Hubbard | ................. F16B 39/24 411/149 |
| 1,224,221 A | * | 5/1917 | Schwanebeck | ....... F16K 31/122 251/63 |

(Continued)

FOREIGN PATENT DOCUMENTS

| CN | 1784566 | 6/2006 |
| EP | 1860359 | 11/2007 |

(Continued)

OTHER PUBLICATIONS

International Search Report and Written Opinion from PCT/US2019/017574 dated May 24, 2019.

*Primary Examiner* — Umashankar Venkatesan
(74) *Attorney, Agent, or Firm* — Calfee, Halter & Griswold LLP (57) ABSTRACT

In an actuated valve assembly, the valve includes a valve body defining a fluid passageway, an annular valve seat disposed on the valve body surrounding the fluid passageway, and a valve closing member movable between a closed position sealing against the valve seat and a fully open position spaced apart from the valve seat to permit flow. The actuator includes an actuator housing and an actuating mechanism movable within the actuator housing, by operation of the actuator, between a closing position in which the actuating mechanism holds the valve closing member in the closed position, and an opening position in which the actuating mechanism permits movement of the valve closing member toward the fully open position, the opening position being defined by engagement of the actuating mechanism with a stop portion of the actuator. The actuator is threadably adjustable on the valve to adjust a position of the actuator stop portion with respect to the valve seat, such that the opening position of the actuating mechanism may be (Continued)

selected to limit the valve closing member to a partial flow position between the fully open position and the closed position.

14 Claims, 8 Drawing Sheets

(51) Int. Cl.
*F16K 31/14* (2006.01)
*F16K 27/02* (2006.01)
*B05C 5/02* (2006.01)
*F16K 31/126* (2006.01)

(52) U.S. Cl.
CPC ............ *F16K 31/14* (2013.01); *B05C 5/0237* (2013.01); *F16K 31/126* (2013.01)

(56) References Cited

U.S. PATENT DOCUMENTS

| | | | | |
|---|---|---|---|---|
| 3,934,626 | A * | 1/1976 | Hall | B29C 45/23 |
| | | | | 141/117 |
| 5,112,027 | A * | 5/1992 | Hanyu | F16K 7/16 |
| | | | | 251/274 |
| 5,222,715 | A * | 6/1993 | Framberg | F16K 27/003 |
| | | | | 137/596.15 |
| 5,295,660 | A * | 3/1994 | Honma | F16K 35/00 |
| | | | | 251/288 |
| 6,196,523 | B1 * | 3/2001 | Miyata | F16K 1/302 |
| | | | | 251/264 |
| 7,337,805 | B2 * | 3/2008 | Brown | F16K 7/14 |
| | | | | 137/625.33 |
| 9,115,813 | B2 * | 8/2015 | Hirose | F16K 7/14 |
| 9,920,857 | B2 * | 3/2018 | Tanikawa | F16K 31/1221 |
| 10,337,632 | B2 * | 7/2019 | Zuber | F16K 27/0236 |
| 2002/0047102 | A1 * | 4/2002 | Hankin | F16K 3/32 |
| | | | | 251/285 |
| 2009/0050832 | A1 * | 2/2009 | Ejiri | F16K 31/1225 |
| | | | | 251/213 |
| 2011/0001077 | A1 * | 1/2011 | Masen | F16K 31/047 |
| | | | | 251/321 |
| 2014/0103240 | A1 | 4/2014 | Glime, III | |
| 2017/0016544 | A1 * | 1/2017 | Chiba | F16K 31/1221 |

FOREIGN PATENT DOCUMENTS

| | | |
|---|---|---|
| WO | 2006/089110 | 8/2006 |
| WO | 2015/079444 | 6/2015 |

* cited by examiner

FLOW CONTROL DEVICE WITH FLOW ADJUSTMENT MECHANISM

CROSS-REFERENCE TO RELATED APPLICATION

This application claims priority to and all benefit of U.S. Provisional Patent Application Ser. No. 62/633,705, filed on Feb. 22, 2018 and entitled FLOW CONTROL DEVICE WITH FLOW ADJUSTMENT MECHANISM, the entire disclosure of which is incorporated herein by reference.

TECHNICAL FIELD

The present disclosure relates to valve actuators. More particularly, the disclosure relates to valve actuators that include a stroke adjustment mechanism.

BACKGROUND

Many linear control valves (e.g., diaphragm valves, bellows valves) utilize fluid driven actuators (e.g., pneumatic actuators) to control valve operation between open and closed conditions. A typical pneumatic actuator includes one or more pistons that are coupled to an actuating mechanism (e.g., piston/stem) to move a valve closing member (e.g., diaphragm) against a valve seat to close the valve. Pneumatic actuated valves can be normally closed (i.e., actuator is pressurized to open the valve), normally open (i.e., actuator is pressurized to close the valve), or double acting (i.e., actuator first port is pressurized to open the valve, actuator second port is pressurized to close the valve). In a normally closed valve, a spring biases the piston and thus the valve element to force the valve closing member against the valve seat to maintain the valve in a closed condition. To open the valve, air pressure is supplied to the actuator and acts on a piston face to move the piston against the spring force. As the actuator piston moves, it allows the valve closing member to disengage from the valve seat thereby opening the valve to flow. In typical prior art actuators, the piston is provided with additional travel distance to ensure that the actuator, and valve, is fully open when actuated. In this arrangement, the actuator moves the valve closing member between fully opened and closed positions.

SUMMARY

According to an exemplary embodiment of the present disclosure, an actuated valve assembly includes an actuator assembled with a valve. The valve includes a valve comprising a valve body defining a fluid passageway, an annular valve seat disposed on the valve body surrounding the fluid passageway, and a valve closing member movable between a closed position sealing against the valve seat and a fully open position spaced apart from the valve seat to permit flow. The actuator includes an actuator housing and an actuating mechanism movable within the actuator housing, by operation of the actuator, between a closing position in which the actuating mechanism holds the valve closing member in the closed position, and an opening position in which the actuating mechanism permits movement of the valve closing member toward the fully open position, the opening position being defined by engagement of the actuating mechanism with a stop portion of the actuator. The actuator is threadably adjustable on the valve to adjust a position of the actuator stop portion with respect to the valve seat, such that the opening position of the actuating mechanism may be selected to limit the valve closing member to a partial flow position between the fully open position and the closed position.

According to another exemplary embodiment of the present disclosure, a method of adjusting flow is contemplated for an actuated valve assembly including a valve having a valve closing member movable between a closed position in sealing engagement with a valve seat and a fully open position and an actuator including an actuating mechanism movable within the actuator housing, by operation of the actuator, between a closing position in which the actuating mechanism holds the valve closing member in the closed position, and an opening position in which the actuating mechanism permits movement of the valve closing member toward the fully open position, the opening position being defined by engagement of the actuating mechanism with a stop portion of the actuator. In the exemplary method, the actuator is threadably adjusted on the valve to adjust a position of the actuator stop portion with respect to the valve seat, such that the opening position of the actuating mechanism may be selected to limit the valve closing member to a partial flow position between the fully open position and the closed position. The opening position of the actuating mechanism is maintained by securing the actuator against inadvertent threaded rotation on the valve.

According to another exemplary embodiment of the present disclosure, a method of modifying an actuated valve assembly to permit user adjustment of a valve flow rate is contemplated for an actuated valve assembly including a valve having a valve closing member movable between a closed position in sealing engagement with a valve seat and a fully open position and an actuator including an actuating mechanism movable within the actuator housing, by operation of the actuator, between a closing position in which the actuating mechanism holds the valve closing member in the closed position, and an opening position in which the actuating mechanism permits movement of the valve closing member toward the fully open position, the opening position being defined by engagement of a stop portion of the actuating mechanism with a stop portion of the actuator. In the exemplary method, the actuator is disassembled from the valve, and one of an actuating mechanism extending component and a valve closing member extending component is installed with a corresponding one of the actuator and the valve to increase an axial length of a corresponding one of the actuating mechanism and the valve closing mechanism. The actuator is reassembled with the valve, such that the actuator of the reassembled actuated valve assembly may be threadably adjusted on the valve to adjust a position of the actuator stop portion with respect to the valve seat, such that the opening position of the actuating mechanism may be selected to limit the valve closing member to a partial flow position between the fully open position and the closed position.

Further advantages and benefits will become apparent to those skilled in the art after considering the following description and appended claims in conjunction with the accompanying drawings.

BRIEF DESCRIPTION OF THE DRAWINGS

Further advantages and benefits will become apparent to those skilled in the art after considering the following description and appended claims in conjunction with the accompanying drawings, in which:

DETAILED DESCRIPTION

While various inventive aspects, concepts and features of the inventions may be described and illustrated herein as embodied in combination in the exemplary embodiments, these various aspects, concepts and features may be used in many alternative embodiments, either individually or in various combinations and sub-combinations thereof. Unless expressly excluded herein all such combinations and sub-combinations are intended to be within the scope of the present inventions. Still further, while various alternative embodiments as to the various aspects, concepts and features of the inventions—such as alternative materials, structures, configurations, methods, circuits, devices and components, software, hardware, control logic, alternatives as to form, fit and function, and so on—may be described herein, such descriptions are not intended to be a complete or exhaustive list of available alternative embodiments, whether presently known or later developed. Those skilled in the art may readily adopt one or more of the inventive aspects, concepts or features into additional embodiments and uses within the scope of the present inventions even if such embodiments are not expressly disclosed herein. Additionally, even though some features, concepts or aspects of the inventions may be described herein as being a preferred arrangement or method, such description is not intended to suggest that such feature is required or necessary unless expressly so stated. Still further, exemplary or representative values and ranges may be included to assist in understanding the present disclosure, however, such values and ranges are not to be construed in a limiting sense and are intended to be critical values or ranges only if so expressly stated. Parameters identified as "approximate" or "about" a specified value are intended to include both the specified value and values within 10% of the specified value, unless expressly stated otherwise. Further, it is to be understood that the drawings accompanying the present disclosure may, but need not, be to scale, and therefore may be understood as teaching various ratios and proportions evident in the drawings. Moreover, while various aspects, features and concepts may be expressly identified herein as being inventive or forming part of an invention, such identification is not intended to be exclusive, but rather there may be inventive aspects, concepts and features that are fully described herein without being expressly identified as such or as part of a specific invention, the inventions instead being set forth in the appended claims. Descriptions of exemplary methods or processes are not limited to inclusion of all steps as being required in all cases, nor is the order that the steps are presented to be construed as required or necessary unless expressly so stated.

The Detailed Description merely describes exemplary embodiments and is not intended to limit the scope of the claims in any way. Indeed, the invention as claimed is broader than and unlimited by the exemplary embodiments, and the terms used in the claims have their full ordinary meaning. For example, while specific exemplary embodiments in the present disclosure describe actuated diaphragm valves utilizing normally closed pneumatic (or "air") actuators, one or more of the features described herein may additionally or alternatively be applied to other types of flow control devices (e.g., other valves, such as bellows valves or gate valves), and/or other types of actuators (e.g., other pneumatic actuators, such as normally open or double acting actuators, other automatic actuators, such as hydraulic or electric actuators, and manual actuators, such has handle-operated toggle or rotary manual actuators).

The present disclosure relates to valve actuators for use with valves for controlling fluid flow and is applicable to valves of different constructions. The disclosure contemplates assemblies that allow adjustment of the flow through a valve by threadably adjusting the actuator on the valve, thereby adjusting an axial distance between the valve closing member and an upper limit or end position of the actuating member (e.g., actuator piston/stem), as defined by a stop portion in the actuator.

Figure 1A:
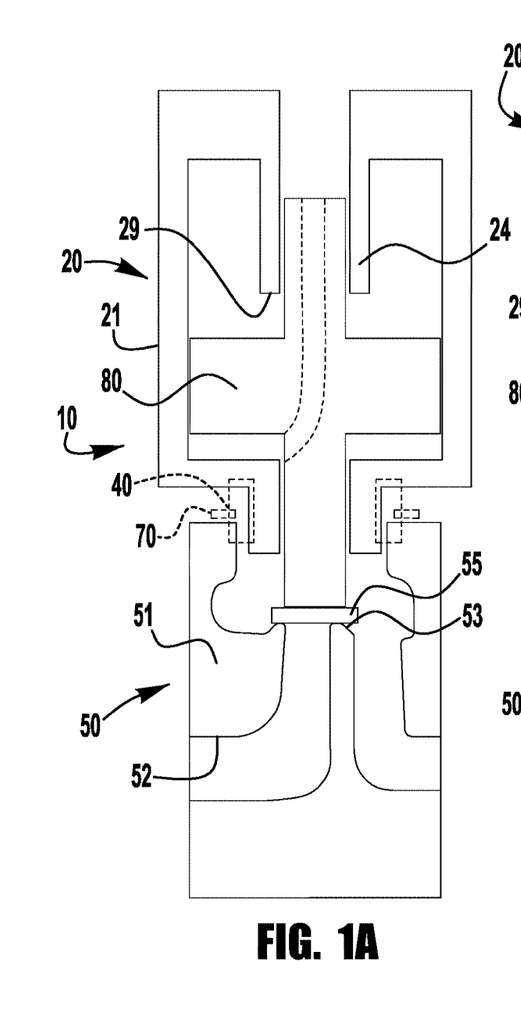
FIG. 1A is a schematic cross-sectional view of an actuated valve assembly according to an exemplary embodiment of the present disclosure, shown with the actuating mechanism in an extended position.
Figure 1B:
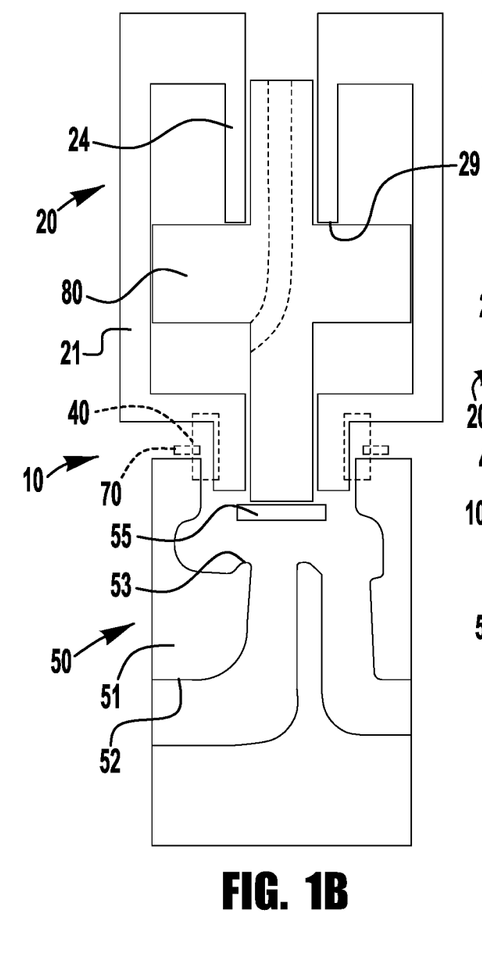
FIG. 1B is a schematic cross-sectional view of the actuated valve assembly of FIG. 1A, shown with the actuating mechanism in a retracted position.

FIGS. 1A and 1B schematically illustrate an actuated valve assembly 10 including a valve actuator 20 assembled with a valve 50. The actuator 20 includes an actuator housing 21 and an actuating mechanism 80 (e.g., a piston/stem arrangement). The actuating mechanism 80 is axially movable within the actuator housing 21 such that the actuating member has a range of motion between a first, extended position (shown in FIG. 1A) and a second, retracted position (shown in FIG. 1B). The actuating mechanism 80 may be biased toward either the retracted position or the extended position by a biasing member such as a spring, disposed within the actuator housing.

The exemplary valve 50 includes a valve body 51 defining a fluid passageway 52, an annular valve seat 53 disposed on the valve body surrounding the fluid passageway, and a valve closing member 55 (e.g., a diaphragm, bellows, poppet, etc.) movable between a closed position sealing against the valve seat and a fully open position spaced apart from the valve seat to permit flow. In the extended position, the actuating mechanism 80 holds the valve closing member 55 in the closed position. In the retracted position, the actuating mechanism 80 permits axial movement of the valve closing member 55 to the fully open position, as limited by the valve (e.g., flexure limit of a diaphragm, abutment of the valve closing member with a valve surface).

Figure 2A:
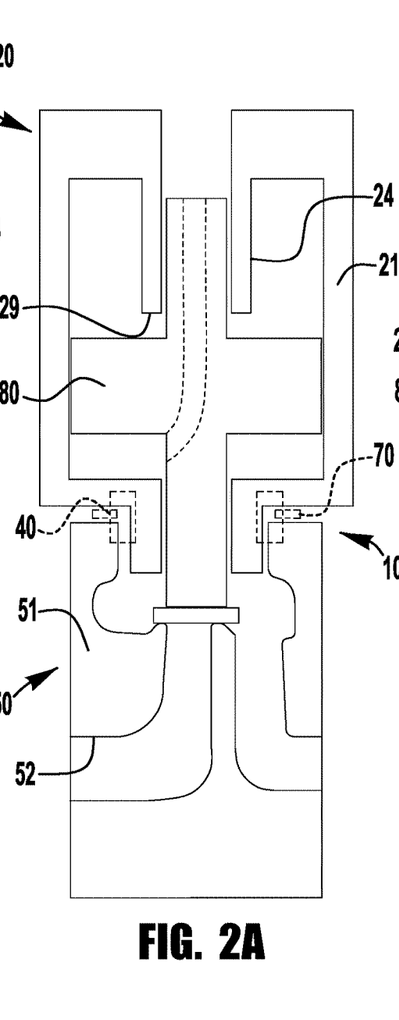
FIG. 2A is a schematic cross-sectional view of the actuated valve assembly of FIG. 1A, shown with the actuator adjusted to a reduced stroke position, with the actuating mechanism in an extended position.
Figure 2B:
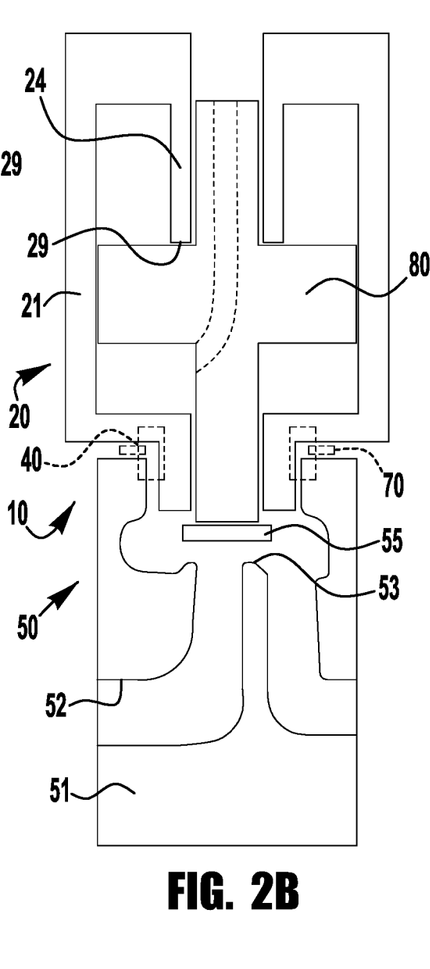
FIG. 2B is a schematic cross-sectional view of the actuated valve assembly of FIG. 1A, shown with the actuator adjusted to a reduced stroke position, with the actuating mechanism in a retracted position.

As shown in FIG. 1B, the retracted position may be defined by abutment of the actuating mechanism 80 with a stop portion 29 of the actuator 20 (e.g., an end portion of actuator guide channel 24). In conventional valve-actuator assemblies, this retracted position of the actuating mechanism provides clearance for movement of the valve closing member to the fully open position when the actuator is fully installed on the valve, for example, when the actuator is threadably installed on the valve to a "hard stop" position. According to an aspect of the present disclosure, a valve-actuator assembly may be configured such that the actuator 20 may be threadably adjusted beyond a first position (FIG. 1A), in which the retracted actuating mechanism 80 permits a fully open position of the valve closing member, to one or more selected reduced flow positions (FIGS. 2A, 3A) in which the retracted actuating mechanism 80 limits movement of the valve closing member 55 to a partially open position between the fully open position and the closed position, for example, to adjust a desired flow rate through the valve 50 when in the open condition. The threaded adjustment of the actuator 20 on the valve 50 adjusts the actuator stroke by adjusting the axial distance between the actuator stop portion 29 and the valve seat 53.

Figure 4:
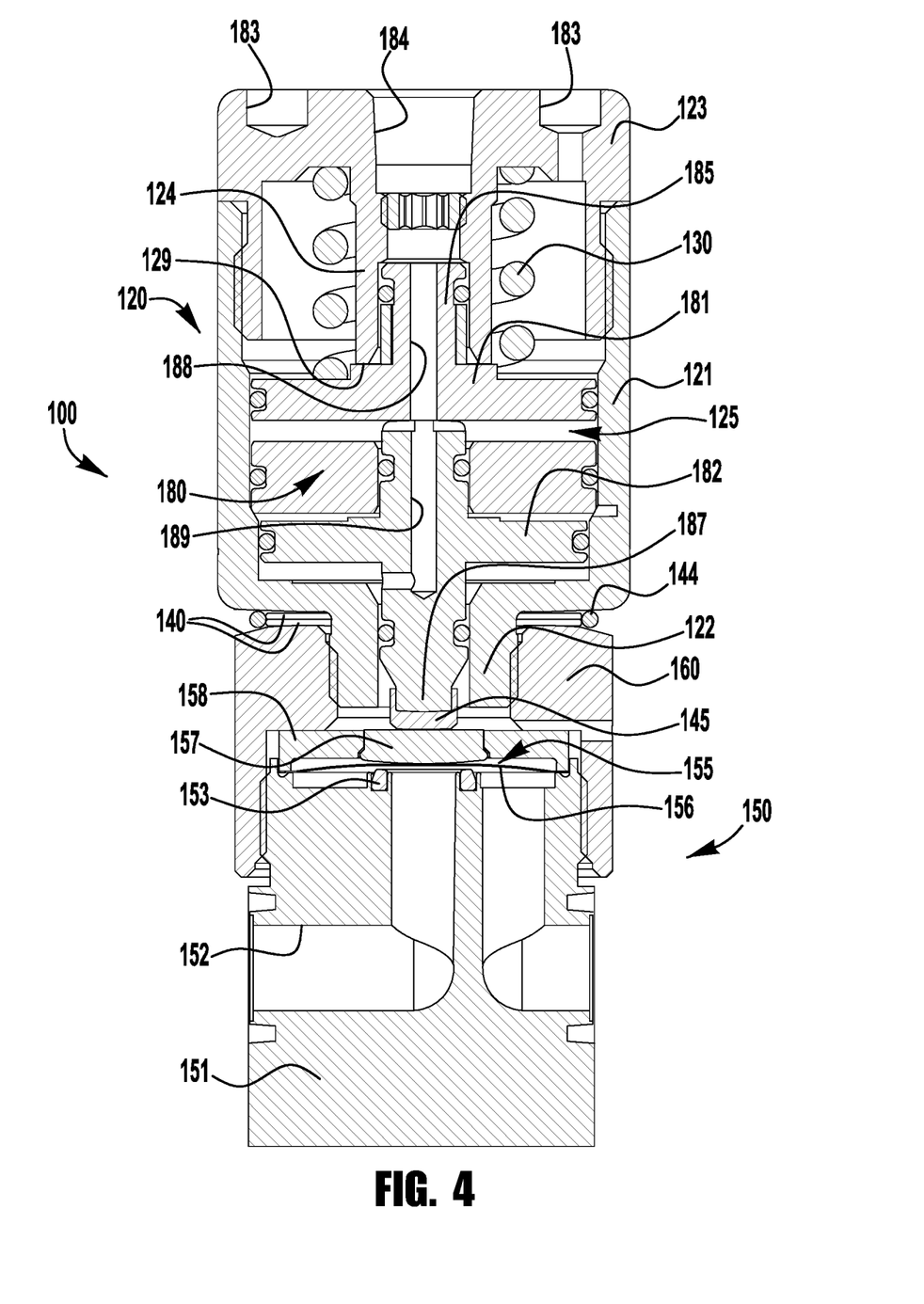
FIG. 4 is a cross-sectional view of an actuated valve assembly according to an exemplary embodiment of the present disclosure.

Many different types of actuated valves may utilize an adjustable actuator for adjusting valve flow. FIG. 4 illustrates an exemplary actuated diaphragm valve assembly 100 including a normally closed pneumatic actuator 120 assembled with a diaphragm valve 150 including a valve body 151 defining a fluid passageway 152, an annular valve seat 153 disposed on the valve body (e.g., a plastic seat insert staked into the valve body) surrounding the fluid passageway, and a valve closing member 155 including a flexible metal diaphragm 156 and an actuator button 157. The valve closing member 155 is movable between a closed position sealing against the valve seat 153 and a fully open position spaced apart from the valve seat to permit flow. A bonnet nut 160 is threaded onto an upper threaded portion of the valve body 151 and secures the diaphragm 156 and actuator button 157 with the valve body 151, along with a diaphragm supporting disc 158.

The actuator 120 includes an actuator housing 121 assembled with an end cap 123 to define an interior chamber 125 of the actuator. The lower end of the actuator housing 121 includes a threaded connector 122 threaded into an interior threaded portion of the bonnet nut 160 to secure the actuator 120 to the valve 150. An actuating mechanism 180 is disposed in the chamber 125 and includes a first or upper piston member 181 with an upper end portion 185 received in a guide channel 124 in the end cap 123, and a second or lower piston member 182 with a lower end portion 187 extending through the actuator connector 122 and into the valve body 151. A biasing member 130 (e.g., compression spring) is disposed in the actuator chamber 125, with a first end engaging the end cap 123 and a second end engaging the upper piston member 181, to force the actuating mechanism 180 into a normally extended position, in which the lower end portion 187 of the lower piston member 182 engages the actuator button 157 to hold the diaphragm 156 in a closed position against the valve seat 153. When pressurized air is applied to an inlet port 184 in the end cap 123, the pressurized air passes through flow channels 188, 189 in the piston members 181, 182 to pressurize portions of the actuator chamber below the piston members, causing the piston members to move upward against the force of the spring 130, with the upper piston member 181 abutting an actuator stop portion 129 (e.g., the end portion of the guide channel 124) to define the opening position of the actuating mechanism 180. In this opening position, the lower end portion 187 of the lower piston member 182 is retracted into the actuator 120, thereby permitting the diaphragm 156 to flex or deflect away from the valve seat 153 to permit fluid flow through the valve 150.

To adjust the flow rate through the valve 150 when the actuator 120 is in the opening position, the actuator may be threadably adjusted on the valve bonnet nut 160, to adjust the axial position of the actuator stop portion 129 with respect to the valve seat 153. When the actuator 120 is threaded upward with respect to the valve body 151 and bonnet nut 160, the actuator stop portion 129 is raised, such that the actuator button 157 and diaphragm 156 are permitted to move further from the valve seat 153 when the actuating mechanism 180 is in the opening position, thereby providing for increased fluid flow. The threaded engagement between the actuator 120 and bonnet nut 160 may, but need not, allow for threadable adjustment of the actuator to a position in which the actuator stop portion 129 allows for movement of the actuating mechanism 180 to a position permitting movement of the diaphragm 156 to the fully open position. When the actuator 120 is threaded downward with respect to the valve body 151 and bonnet nut 160, the actuator stop portion 129 is lowered, to further limit deflection of the diaphragm 156 from the valve seat 153 when the actuating mechanism 180 is in the opening position, thereby providing for reduced fluid flow. To facilitate rotational adjustment of the actuator, one or more tool engagement features may be provided on the actuator housing 121 and/or end cap 123, including, for example, spanner holes 183 (e.g., for a spanner wrench) in the end cap or hex flats on the actuator housing (not shown).

This threaded adjustment of the actuator on the valve may allow for precise, fine adjustment of the valve's open position and the resulting valve flow rate. According to another aspect of the present disclosure, the valve-actuator assembly may be provided with one or more actuator securing arrangements that secure the actuator in a user selected position against inadvertent axial movement of the adjusted actuator, for example due to threaded rotation of the actuator on the valve and/or thread backlash, to maintain the selected opening position of the actuating mechanism while permitting further threaded adjustment. In the exemplary embodiment of FIGS. 1A-3B, an actuator securing arrangement is schematically represented at 40.

Figure 4A:
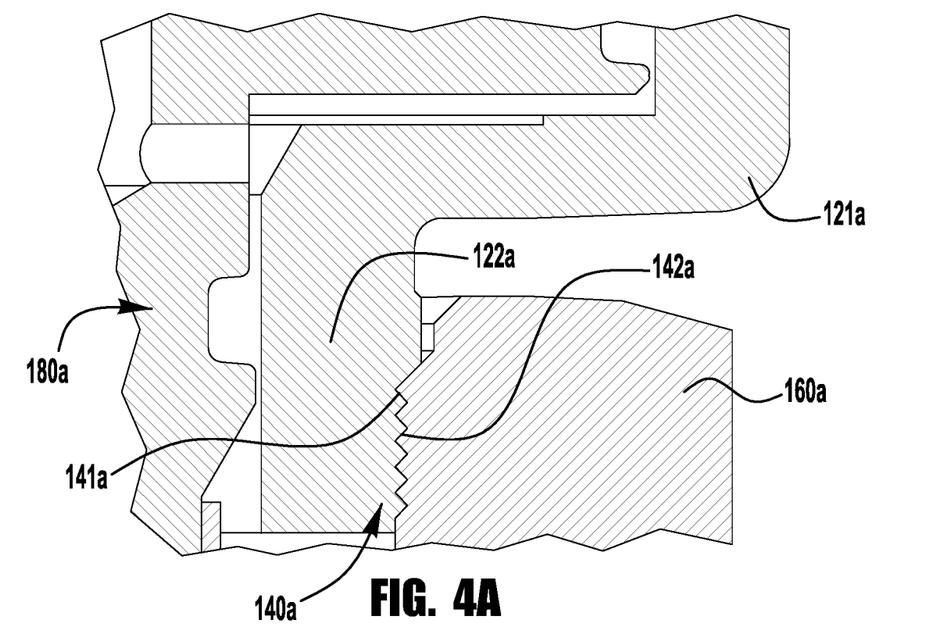
FIG. 4A is an enlarged cross-sectional view of an actuator securing arrangement of an actuated valve assembly, according to another exemplary embodiment of the present disclosure.
Figure 4B:
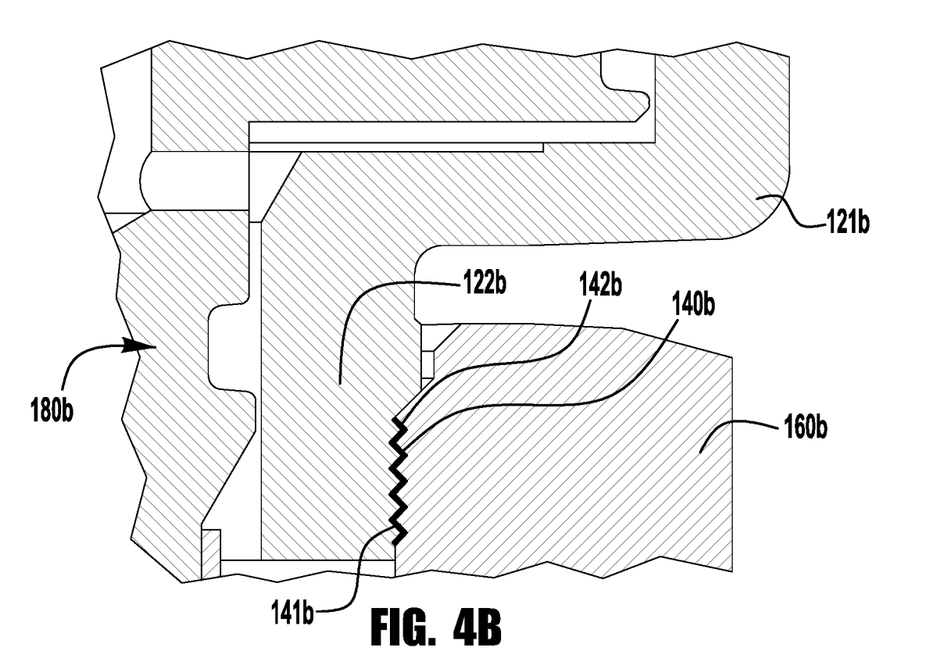
FIG. 4B is an enlarged cross-sectional view of another actuator securing arrangement of an actuated valve assembly, according to another exemplary embodiment of the present disclosure.
Figure 4C:
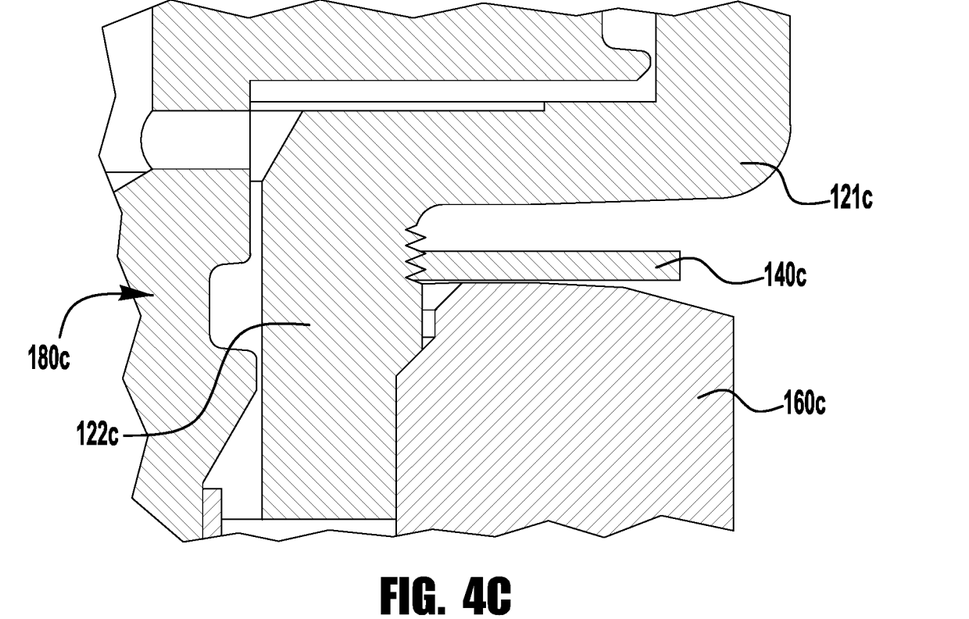
FIG. 4C is an enlarged cross-sectional view of another actuator securing arrangement of an actuated valve assembly, according to another exemplary embodiment of the present disclosure.
Figure 4D:
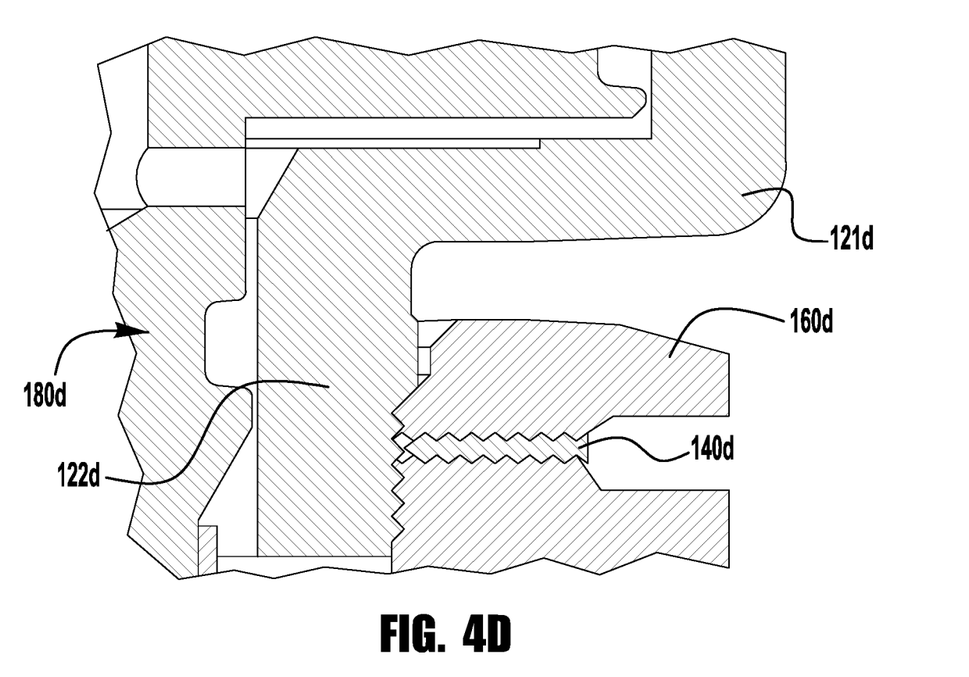
FIG. 4D is an enlarged cross-sectional view of another actuator securing arrangement of an actuated valve assembly, according to another exemplary embodiment of the present disclosure.
Figure 4E:
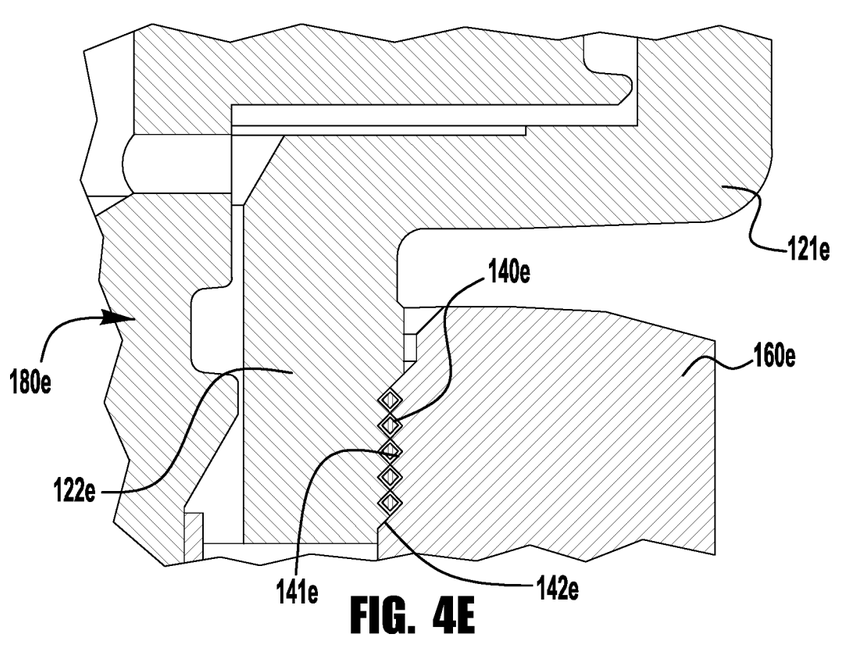
FIG. 4E is an enlarged cross-sectional view of another actuator securing arrangement of an actuated valve assembly, according to another exemplary embodiment of the present disclosure.

A variety of suitable components and materials may be utilized as an actuator securing arrangement, examples of which are illustrated in FIGS. 4 and 4A-4F. As one example, as illustrated in FIG. 4A, an engineered thread interference 140*a* may be provided between the valve threads 141*a* (e.g., female threads on the bonnet nut 160*a*) and the actuator threads 142*a* (e.g., male threads on the actuator connector 122*a*). As another example, as illustrated in FIG. 4B, a thread adhering material 140*b* (e.g., a thread adhesive, a thread adhering patch, or a thread adhering tape) may be applied to the mating threads 141*b*, 142*b* of the valve (e.g., bonnet nut 160*b*) and/or actuator (e.g., connector 122*b*). As yet another example, as illustrated in FIG. 4C, a threaded lock nut 140*c* may be installed on the actuator connector 122*c* and tightened against the valve bonnet nut 160*c* to secure the actuator in the selected threaded position. As another example, as illustrated in FIG. 4D, a set screw 140*d* may be installed in a fastener hole in the side of the bonnet nut for locking engagement with the actuator thread when the set screw is tightened. As still another example, as illustrated in FIG. 4E, a coil thread insert 140*e* (e.g., a Heli-Coil) may be installed between the mating threads 141*e*, 142*e* of the valve (e.g., bonnet nut 160*e*) and actuator (e.g., connector 122*e*).

Figure 4F:
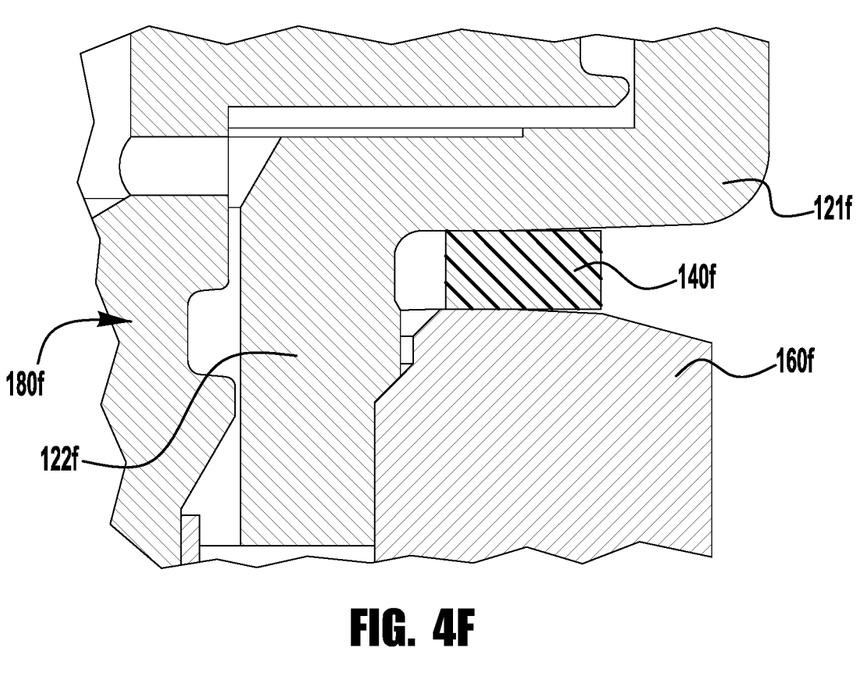
FIG. 4F is an enlarged cross-sectional view of another actuator securing arrangement of an actuated valve assembly, according to another exemplary embodiment of the present disclosure.

In another exemplary embodiment, as schematically illustrated in FIG. 4F, an actuator securing arrangement may include one or more elastically axially compressible members 140*f* installed between opposed radially extending surfaces of the valve and actuator (e.g., upper surface of a valve bonnet nut 160*f* and lower shoulder surface of the actuator housing 121*f*). The elastically axially compressible member or members 140*f* permit threaded advancement of the actuator on the valve, while applying an axial force against the valve and actuator that resists threaded rotation of the actuator on the valve, to prevent inadvertent threaded rotation. A variety of suitable elastically axially compressible members 140*f* may be utilized, including, for example, one or more springs, split-rings, gaskets, O-rings, and Belleville washers. In the exemplary embodiment of FIG. 4, one or more Belleville washers 140 are installed between the bonnet nut 160 and the actuator 120 to allow for sufficient axial adjustment of the actuator (i.e., through axial compression of the Belleville washers) while providing resistance to unintended rotation of the actuator 120. An elastomeric ring or O-ring 144 may be installed around the Belleville washers 140, for example, to retain metallic particulate generated by the washers, to provide a color-coded visual indication that the actuated valve assembly is configured for flow adjustability, and/or to provide additional elastic resistance to axial compression.

In still other embodiments, one or more actuator securing arrangements may additionally or alternatively impede or resist intentional modification of or tampering with the user selected actuator position. For example, a tamper resistant set screw (e.g., the set screw 140*d* of the embodiment of FIG. 4D) may be configured to require use of a non-standard tool (e.g., pentagonal key) for loosening to allow for actuator adjustment. As another example, a tamper resistant lock nut (e.g., the lock nut 140*c* of the embodiment of FIG. 4C) may include a non-standard (e.g., no hex flats) outer tool engagement surface configured to require use of a non-standard tool (e.g., collet chuck) for loosening to allow for actuator adjustment. As yet another example, a tamper resistant thread adhesive (e.g., the thread adhesive 140*b* of the embodiment of FIG. 4B) may be selected to require the application of a solvent for release of the adhesive to allow for actuator adjustment.

Additionally or alternatively, one or more actuator securing arrangements may provide indication of tampering with the user selected actuator position. For example, a tamper indicating lock nut (e.g., the lock nut 140*c* of the embodiment of FIG. 4C) may be configured to break apart or break away when loosened to allow for actuator adjustment, such that the broken lock nut provides indication of an adjustment made. As another example, a tamper indicating adhesive tape or patch (e.g., the thread adhesive 140*b* of the embodiment of FIG. 4B) may be configured to tear or break apart when the actuator is adjusted, to provide an indication of the adjustment.

Figure 3A:
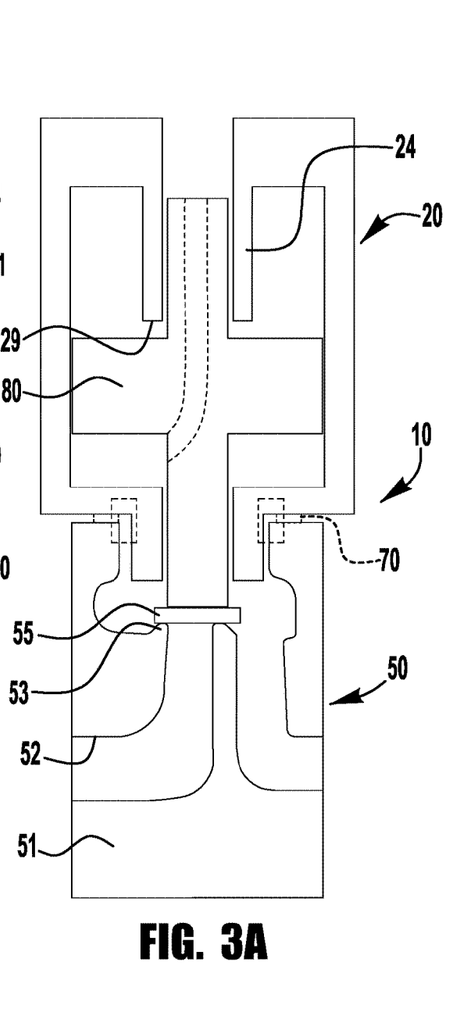
FIG. 3A is a schematic cross-sectional view of the actuated valve assembly of FIG. 1A, shown with the actuator adjusted to a minimum stroke position, with the actuating mechanism in an extended position.
Figure 3B:
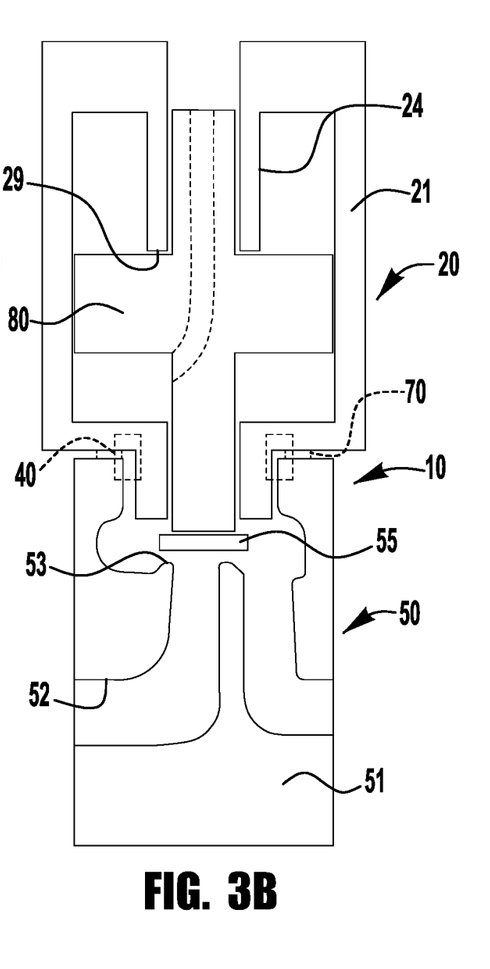
FIG. 3B is a schematic cross-sectional view of the actuated valve assembly of FIG. 1A, shown with the actuator adjusted to a minimum stroke position, with the actuating mechanism in a retracted position.
Figure 4G:
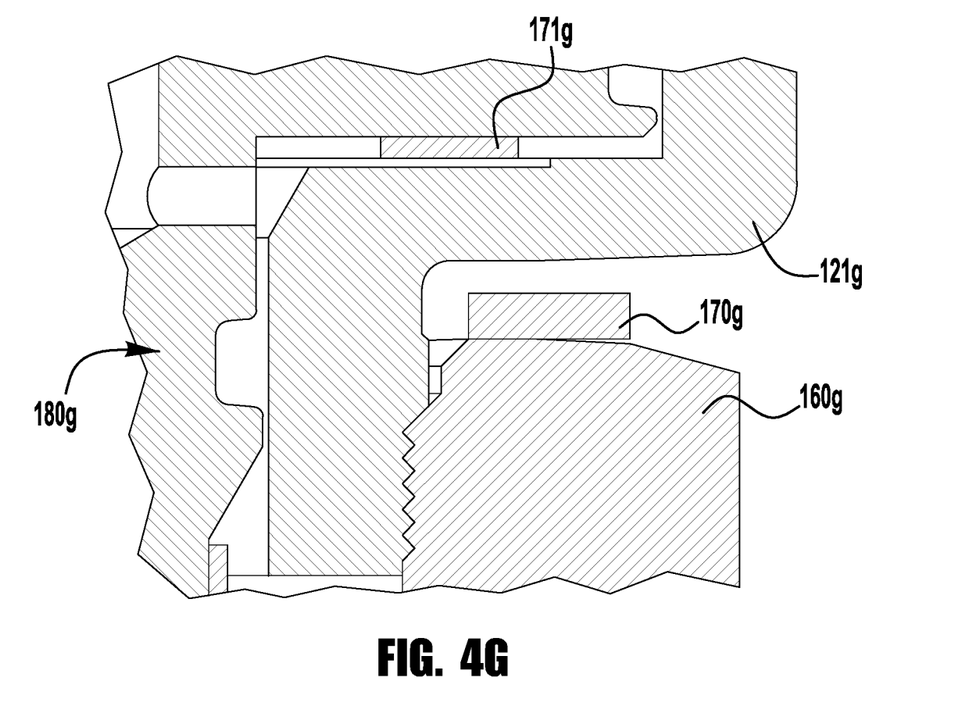
FIG. 4G is an enlarged cross-sectional view of an actuator adjustment limiting arrangement of an actuated valve assembly, according to another exemplary embodiment of the present disclosure.

To prevent adjustment of the actuator to a position in which the retracted actuating mechanism holds the valve closing member in a closed position (i.e., preventing flow in the actuator's opening position), the valve-actuator assembly may be configured to provide a threaded hard stop in a third position (FIGS. 3A and 3B) in which the retracted actuating mechanism 80 permits movement of the valve closing member 55 to a minimum opening position (FIG. 3A). This hard stop may be provided by any number of suitable adjustment limiting features or components (represented schematically at 70 in FIGS. 1A-3B, and at 170*g* in FIG. 4G). As one example, elastically axially compressible members utilized as an actuator securing arrangement may be selected to provide a compression limit (e.g., a fully flattened condition of one or more Belleville washers 140, for example, in the embodiment of FIG. 4) that prevents the actuating mechanism from being adjusted to a closed position when retracted. As another example, two or more opposed surfaces of the actuated valve assembly may abut upon adjustment to a minimum opening position of the actuating mechanism, such as, for example, opposed surfaces of the valve (e.g., bonnet nut upper surface) and the actuator (e.g., actuator housing lower surfaces), or opposed surfaces of the actuator housing and the actuating mechanism. As another example, a rigid spacer may be installed to block further axial advance of opposed surfaces of the actuated valve assembly (e.g., installed between the actuator housing and the valve bonnet nut, at 170*g*, or installed between the actuator housing and the actuating mechanism, at 171*g*).

According to another aspect of the present disclosure, an existing actuated valve assembly may be field-adapted to provide for user adjustability of the flow rate by threadable rotation of the actuator on the valve, as discussed above. To provide for such field adaptability, one or more valve or actuator components may be installed to increase the axial length of at least one of the actuating mechanism and the valve closing member. This adaptation maintains suitable engagement between the actuating mechanism and the valve closing member when the actuator is threadably adjusted to an axially retracted or elevated position on the valve (i.e., with the actuating mechanism and valve closing member being moved further apart), while allowing for a partial flow opening position when the actuator is threadably adjusted to an axially advanced or lowered position on the valve.

Figure 5:
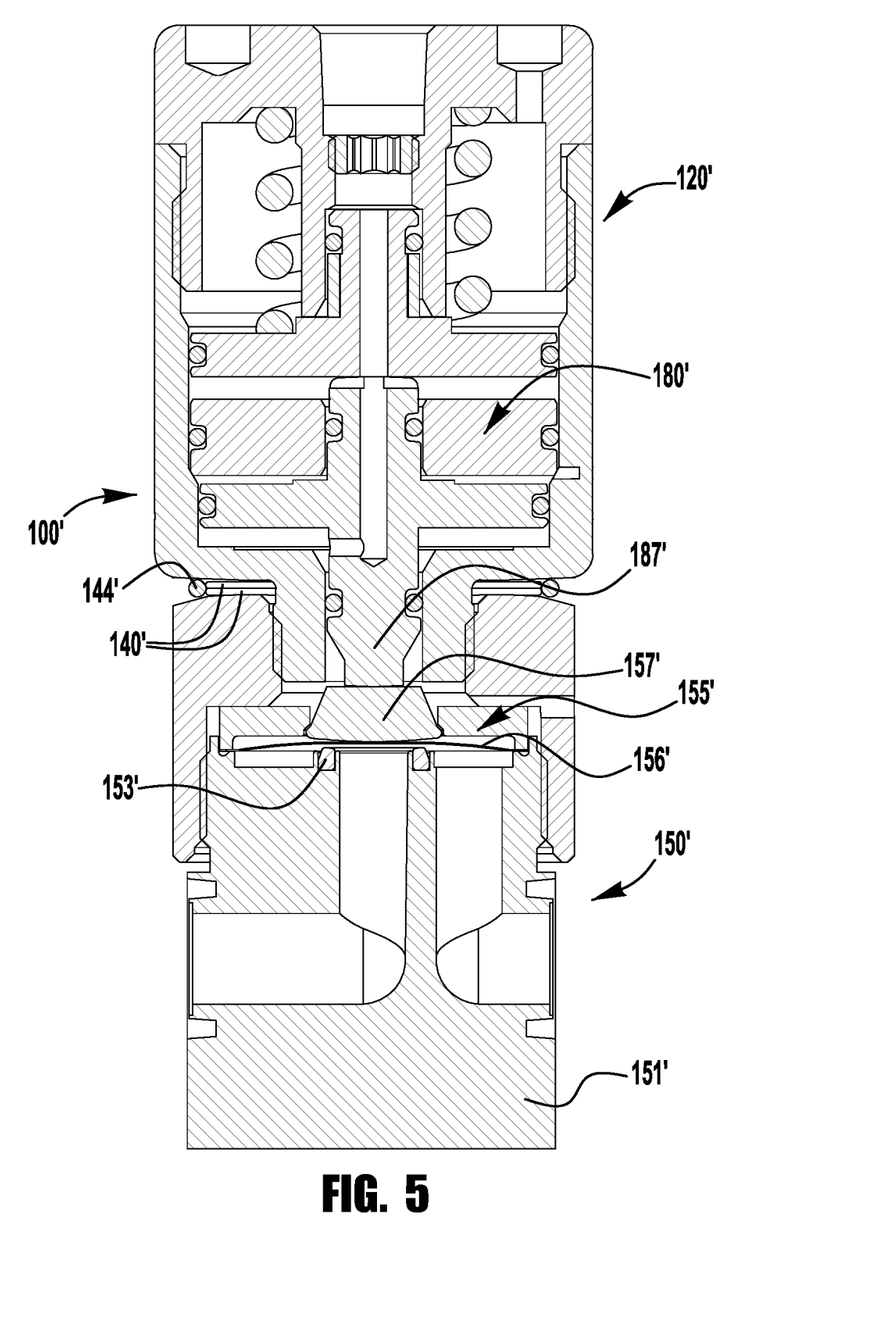
FIG. 5 is a sectional view of an actuated valve assembly according to another exemplary embodiment of the present disclosure.

In one exemplary embodiment, as illustrated in FIG. 4, an overall axial length of an actuating mechanism 180 may be increased by installing a cap extension 145 (e.g., by slip fit, press fit, adhesion) onto the lower end portion 187 of the lower piston member 182. Alternatively, the existing lower piston member may be replaced with a piston member having an elongated lower end portion (not shown). In another exemplary embodiment, as illustrated in FIG. 5, an overall axial length of a valve closing member 155 including a diaphragm 156 and an actuator button may be increased by replacing the existing actuator button (see FIG. 4) with an elongated actuator button 157'. Alternatively, a cap or other such extension (not shown) may be installed on the existing actuator button.

In an exemplary method of modifying an actuated valve assembly to permit user adjustment of a valve flow rate, the actuator is disassembled from the actuated valve assembly (e.g., by loosening and removing the bonnet nut 160), and one of an actuating mechanism extending component and a valve closing mechanism extending component is installed in a corresponding one of the actuator and the valve, to increase an axial length of a corresponding one of the actuating mechanism and the valve closing mechanism. In one such exemplary method, as illustrated in FIG. 4, a cap extension 145 is installed on a lower end portion 187 of a lower piston member 182. In another exemplary method, as illustrated in FIG. 5, the existing actuator button 157 is removed, and an elongated actuator button 157' is installed (e.g., between the diaphragm 156 and the diaphragm supporting disc 158. An actuator securing arrangement 140 (e.g., one or more of a thread adhering material, a threaded lock nut, coil thread insert, and/or an elastically axially compressible members) is assembled with at least one of the valve and the actuator. In one such exemplary method, as illustrated in FIGS. 4 and 5, a stack of Belleville washers 140 is installed between the bonnet nut 160 and the actuator housing 121. The actuator 120 is then reassembled with the valve 150, with the actuator 120 being threaded with the valve 150 at least until engagement of the actuator securing arrangement with the actuator and/or valve provides sufficient resistance to inadvertent threaded rotation of the actuator.

The inventive aspects have been described with reference to the exemplary embodiments. Modification and alterations will occur to others upon a reading and understanding of this specification. It is intended to include all such modifications and alterations insofar as they come within the scope of the appended claims or the equivalents thereof.

The invention claimed is:

1. An actuated valve assembly comprising: a valve comprising a valve body defining a fluid passageway, an annular valve seat disposed on the valve body surrounding the fluid passageway, a valve closing member movable between a closed position sealing against the valve seat and a fully open position spaced apart from the valve seat to permit flow, and a bonnet nut having an outer peripheral portion threadably assembled with the valve body and an inner peripheral portion, radially inward of the outer peripheral portion, having a lower surface securing the valve closing member in the valve body; and an actuator assembled on the bonnet nut, the actuator including an actuator housing and an actuating mechanism movable within the actuator housing, by operation of the actuator, between a closing position in which the actuating mechanism holds the valve closing member in the closed position, and an opening position in which the actuating mechanism permits movement of the valve closing member toward the fully open position, the opening position being defined by engagement the actuating mechanism with a stop portion of the actuator;

wherein the actuator is threadably adjustable on the valve between a first threaded position permitting movement the valve closing member to the fully open position and a second threaded limit position limiting movement of the valve closing member to a minimum partial flow position, to adjust a position of the actuator stop portion with respect to the valve seat, such that the opening position of the actuating mechanism may be selected to limit the valve closing member to a flow position between the fully open position and the minimum partial flow position, wherein the second threaded limit position is a threaded hard stop position preventing the actuating mechanism from holding the valve closing member in the closed position when the actuating mechanism is in the opening position;

wherein the actuated valve assembly further comprises at least one elastically axially compressible member radially aligned with and axially compressed between a lower radially extending surface of the actuator and an upper radially extending surface of the inner peripheral portion of the bonnet nut to secure the actuator in a user selected position against inadvertent threaded rotation of the actuator on the valve, to maintain the selected opening position of the actuating mechanism.

2. The actuated valve assembly of claim 1, wherein the actuator is one of a normally closed actuator, a normally open actuator, and a double acting actuator.

3. The actuated valve assembly of claim 1, wherein the valve closing member comprises at least one of a diaphragm and a bellows.

4. The actuated valve assembly of claim 1, wherein the actuating mechanism comprises an actuator stem and a cap member removably installed on an end portion of the actuator stem, the cap member being sized to allow the opening position of the actuating mechanism to limit the valve closing member to the partial flow position.

5. The actuated valve assembly of claim 1, wherein the actuator stop portion is defined by a surface of the actuator housing.

6. The actuated valve assembly of claim 1, wherein the at least one elastically axially compressible member comprises a spring.

7. The actuated valve assembly of claim 1, wherein the at least one elastically axially compressible member comprises at least one Belleville washer.

8. The actuated valve assembly of claim 7, wherein the hard stop position is defined by a fully flattened condition of the at least one Belleville washer.

9. The actuated valve assembly of claim 1, wherein the at least one elastically axially compressible member comprises a plurality of Belleville washers.

10. The actuated valve assembly of claim 1, wherein the bonnet nut includes a female threaded portion assembled with a male threaded portion of the valve body.

11. The actuated valve assembly of claim 1, wherein the radially extending surface of the actuator is defined by the actuator housing.

12. The actuated valve assembly of claim 1, wherein the hard stop position is defined by a compression limit of the at least one elastically axially compressible member.

13. The actuated valve assembly of claim 1, wherein the hard stop position is defined by one of: abutment of opposed surfaces of the valve and the actuator, abutment of opposed surfaces of the actuator housing and the actuating mechanism, a rigid spacer installed between the actuator and the valve, and a rigid spacer between the actuator housing and the actuating mechanism.

14. An actuated valve assembly comprising:

a valve comprising a valve body defining a fluid passageway, an annular valve seat disposed on the valve body surrounding the fluid passageway, and a valve closing member movable between a closed position sealing against the valve seat and a fully open position spaced apart from the valve seat to permit flow; and an actuator assembled with the valve, the actuator including an actuator housing and an actuating mechanism movable within the actuator housing, by operation of the actuator, between a closing position in which the actuating mechanism holds the valve closing member in the closed position, and an opening position in which the actuating mechanism permits movement of the valve closing member toward the fully open position, the opening position being defined by engagement of the actuating mechanism with a stop portion of the actuator;

wherein the actuator is threadably adjustable on the valve between a first threaded position and a second threaded limit position to adjust a position of the actuator stop portion with respect to the valve seat, such that the opening position of the actuating mechanism may be selected to limit the valve closing member to a partial flow position between the fully open position and the closed position;

wherein the actuated valve assembly further comprises at least one elastically axially compressible member axially compressed between opposed radially extending surfaces of the valve and the actuator to secure the actuator in a user selected position against inadvertent threaded rotation of the actuator on the valve, to maintain the selected opening position of the actuating mechanism;

the actuated valve assembly further comprising an elastomeric ring installed around the elastically axially compressible member.

\* \* \* \* \*